(No Model.)  2 Sheets—Sheet 1.
I. B. FRAZEE.
ALARM.
No. 603,898. Patented May 10, 1898.
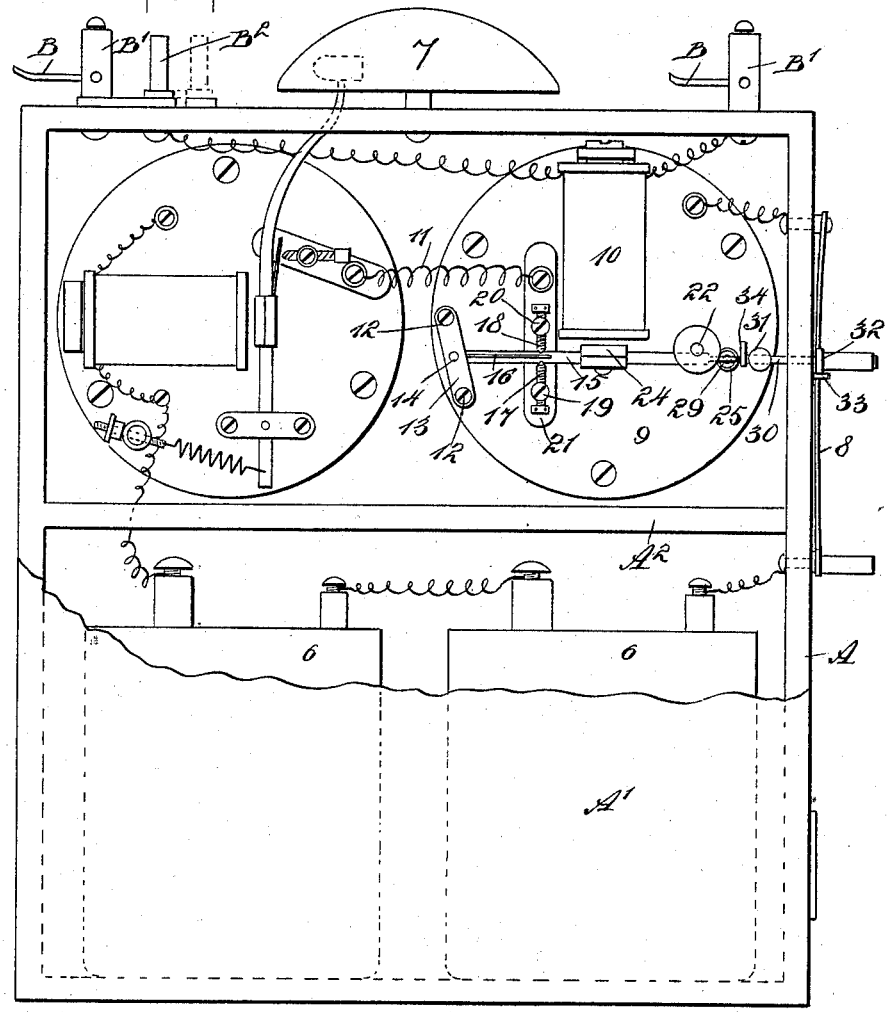

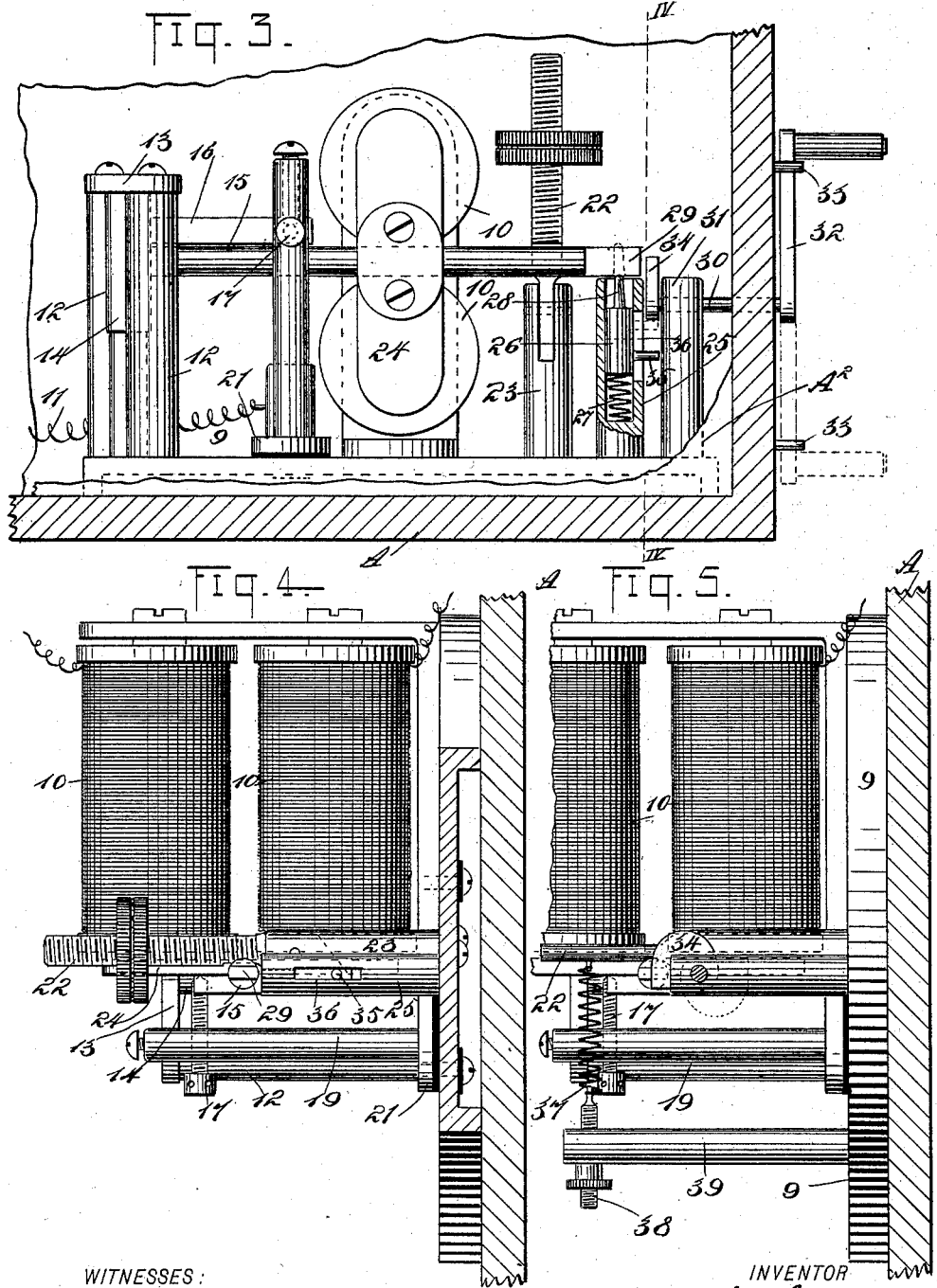

UNITED STATES PATENT OFFICE.

IRA B. FRAZEE, OF BLAIRSTOWN, IOWA.

ALARM.

SPECIFICATION forming part of Letters Patent No. 603,898, dated May 10, 1898.

Application filed March 6, 1897. Serial No. 626,278. (No model.)

*To all whom it may concern:*

Be it known that I, IRA B. FRAZEE, of Blairstown, in the county of Benton and State of Iowa, have invented a certain new and useful Improvement in Alarms, of which the following is a full, clear, and exact description.

This invention relates to an improvement in alarms adapted particularly for detecting the fraudulent entrance of persons into buildings. The invention employs an electrical circuit adapted to be broken by the making of such fraudulent entry, whereby electromagnetic mechanism will be released to throw into operation a bell or other alarm.

The invention will be fully described hereinafter and defined in the claims.

Reference is to be had to the accompanying drawings, forming a part of this specification, in which similar characters of reference indicate corresponding parts in all the figures.

Figure 1 is a front elevation of my invention with parts broken away to disclose the interior of the casing. Fig. 2 is a diagram of the alarm-circuit. Fig. 3 is a bottom plan of the electromagnetic mechanism, wherein my invention consists. Fig. 4 is a sectional view on the line IV IV of Fig. 3, and Fig. 5 is an elevation of a modified form of the invention.

As shown in Fig. 2, the casing A, containing the alarm apparatus proper, is in connection with the terminals of an electric circuit B, energized by a battery C. The circuit B runs throughout the places to be protected and the casing A is located at a point from which the alarm may be heard.

The casing A has a hingedly-mounted door A', which is shown partly broken away in Fig. 1. Located within the casing A is a partition A², dividing the casing into two compartments. In the lower of these compartments the batteries 6 are located. The batteries 6 energize an electric alarm-bell 7 of any preferred construction. By means of a switch-arm 8 the current from the battery C is led to a circular base-plate 9. The switch 8 furnishes means by which the circuit of the batteries 6 may be opened or closed. The wires B of the alarm-circuit are respectively attached to binding-posts B' and are in communication with the electromagnet 10, whereby to energize said magnet. A manually-operative switch B² serves to control the circuit B. A wire 11 leads from the base-plate 9 to the alarm-bell 7. Mechanism controlled by the magnet 10 in turn controls the circuit of the batteries 6. When this circuit is open, the alarm 7 is inoperative, and when the circuit is closed the alarm is sounded. When the circuit B is closed, the circuit of the batteries 6 is held open. When the circuit B is broken, the circuit of the batteries 6 is closed and the alarm 7 is sounded.

Projecting horizontally from the base-plate 9, which plate is held vertically against the rear wall of the casing A, are two posts 12, the outer ends of which hold a plate 13. Between the plate 13 and the base-plate 9 a rocking pin 14 is mounted, to which is fixed an arm 15. Fixed to the pin 14 is a spring contact-plate 16, which normally projects parallel with the arm 15 and has movement between two contact-screws 17 and 18, respectively carried by the posts 19 and 20, in turn held on a plate 21, insulated from and supported on the base-plate 9. The wire 11 is in electrical connection with the plate 21. The base-plate 9 is normally charged from the batteries 6. As the arm 15 swings, the contact-plate 16 will make connection with one of the contact-screws 17 or 18, whereupon the plate 21 will be placed in electrical connection with the plate 9 and the circuit of the batteries 6 will be closed, whereupon the bell 7 will be sounded.

It is the purpose of the electromagnet 10 to hold the arm 15 poised in a position which will place the spring-plate 16 intermediate between the contact-screws 17 and 18. This operation is effected by means of a loaded arm 22, pivoted on a post 23, carried by the plate 9. The arm 22 has a knuckle-joint by which connection is effected with the post 23, so that the arm 22 will normally hang in the horizontal position shown in the drawings, and the knuckle prevents any further depression of the arm below a horizontal position. The arm 22 bears on the top of the arm 15 near the free end thereof. By adjusting the load on the arm 22 the pressure exerted by said arm on the arm 15 may be regulated, so as to keep the arm 22 in its horizontal position. In practice, therefore, the load on the arm 22 is adjusted, so that the magnet 10, coacting with the armature 24, which is attached to the arm 15, will hold the arm 15 pressed firmly against the under side of the arm 22 with force almost sufficient to lift the arm 22. Thus upon the relaxation of the force exerted by the magnet 10 the arm 15 will drop and the plate 16 will contact with the screw 17, or if persons should tamper with the battery C, so as to increase or diminish the force thereof, the arm 15 will on the one hand be lifted to contact the plate 16 with the screw 18 or be dropped to contact the plate 16 with the screw 17. In either event the circuit of the batteries 6 is closed and the alarm 7 is sounded.

I provide means by which the arm 15 is moved or permitted to move to a position which will close the circuit of the batteries 6, by which means to hold the arm 15 and insure the permanent ringing of the alarm, so that the slightest variation in the electromotive force of the circuit B will throw the alarm into operation, and this mechanism to which I have referred will keep the alarm operative. These means consist in a tubular post 25, projecting out from the plate 9 and having a block 26 reciprocal through it. The block 26 is pressed by a spring 27, contained within the post 25. The block 26 is also provided with a pin 28, projecting from its front end. The free end of the arm 15 moves vertically past the outer end of the post 25, and such free end of the arm 15 is reduced on each side to form a plate 29. When the arm 15 is poised with the contact-plate 16 between the screws 17 and 18, the plate 29 is disposed so that the outer end of the pin 28 will bear with nice adjustment on the inner edge of the plate 29. The instant that the arm 15 moves to one side or the other the spring 27 pushes the block 26 out and causes the pin 28 to lie either above or below the plate 29, and will hold the said plate in such position. This insures the permanent closing of the circuit of the batteries 6 and causes the alarm to sound continually. In order to return the block 26 to the position shown by full lines in Fig. 3 and to hold the same there, if so desired, I provide a crank-shaft 30, mounted in a post 31, carried by the base-plate 9, and also mounted in the casing A. The rock-shaft 30 carries a crank-arm 32 at its outer end. The crank-arm 32 is capable of swinging between the stops 33, which are arranged in a horizontal line and project outwardly from one side of the casing A. Attached to the inner end of the rock-shaft 30 is a cam 34. The cam 34 rocks with the shaft 30 to engage a pin 35, carried on the block 26 and movable through a longitudinal slot 36 in the post 25.

The modification of my invention shown in Fig. 5 consists in the use of a spring 37, whereby to weight the arm 22. In the first form of my invention the arm 22 is loaded by a weight adjustable on the arm. In the modification the spring 37 loads the arm 22 and is adjustable by means of a screw 38, carried on a post 39, projected from the plate 9. For the bell 7 any sort of an alarm may be substituted. My invention consists in the construction of the mechanism carried by the plate 9 and in the adaptation of the same to the casing A.

Various other changes in the form, proportions, and details of my invention may be resorted to without departing from the spirit and scope thereof. Hence I consider myself entitled to all such variations as come within the principle of the variation as defined in the claims.

Having thus described my invention, I claim as new and desire to secure by Letters Patent—

1. The combination of an electromagnet, an armature-arm pivotally mounted adjacent to the electromagnet, an arm pivotally mounted above and bearing on the armature-arm, and a spring-pressed block bearing against one edge of the armature-arm and capable of engaging either side of the armature-arm according to the position to which said arm moves, substantially as described.

2. The combination of an electromagnet, an armature-arm pivotally mounted adjacent to the electromagnet and having each side of its free end reduced to form a plate, a tubular post, a block-spring pressed and sliding within the post, the block having a pin carried at its outer end and normally engaging one edge of the plate, the pin being capable of moving to either side of the plate according to the position to which the armature moves, and means for moving the block within the tubular post and against the tension of the spring, substantially as described.

3. The combination with a base-plate, of two posts carried by the base-plate, a plate carried by the posts, a pin rockably mounted in the plate and in the post-plate an armature-arm fixedly carried by the pin, a contact-plate carried by the pin and running parallel with the arm, a plate carried on and insulated from the base-plate, two posts rising from said insulated plate, a contact-screw carried by each post, the contact-screws being located respectively above and below the contact-plate and a magnet coactive with the armature-arm, substantially as described.

4. The combination with an armature-arm, of a tubular post, a block sliding in the post, a spring pressing the block, a pin carried by the block and movable through a slot in the tubular post, a rock-shaft mounted adjacent to the tubular post and a cam carried by the rock-shaft and capable of engaging the pin in the block, substantially as described.

5. The combination of a magnet, an armature pivotally mounted adjacent to the magnet to swing toward and from the same, a spring-plate carried by the armature, and extending in the plane thereof, two contact devices between which the spring-plate is poised and a load for the armature, the load being pivoted to bear against the armature in opposition to the magnet, and the pivot of the load being at an angle to the pivot of the armature.

6. The combination of a magnet, an armature arranged in front of the same, a device acting upon the armature for opposing the attractive influence of said magnet on its armature, and a steadying device acting against the armature and holding it in the plane of the neutralized forces, substantially as and for the purpose described.

7. The combination with an electromagnet arranged in a normally-closed main-line circuit, a subjacent armature-lever, a hinged and adjustably-weighted arm arranged at right angles to and resting upon the armature-lever to balance the attractive influence of the magnet, and two contact-posts arranged upon opposite sides of the armature-lever and both out of contact with the same when in its balanced position, and an alarm-circuit arranged to be closed by the movement of the armature-lever in either direction, substantially as and for the purpose described.

IRA B. FRAZEE.

Witnesses:
SAMUEL S. SPICER,
WAYNE E. FRANTZ.